(12) United States Patent
Yusu et al.

(10) Patent No.: US 6,296,915 B1
(45) Date of Patent: Oct. 2, 2001

(54) OPTICAL RECORDING MEDIUM

(75) Inventors: Keiichiro Yusu, Yokohama; Sumio Ashida, Tokyo-To; Akira Kikitsu, Yokohama; Toshihiko Nagase, Tokyo-To; Katsutaro Ichihara, Yokohama; Naomasa Nakamura, Yokohama; Naoki Morishita, Yokohama; Katsumi Suzuki, Chofu, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/419,609

(22) Filed: Oct. 18, 1999

(30) Foreign Application Priority Data

Oct. 19, 1998 (JP) .................................................. 10-297328

(51) Int. Cl.$^7$ ........................................................ B32B 3/00
(52) U.S. Cl. ........................ 428/64.1; 428/64.4; 428/64.5; 428/64.6; 428/913; 430/270.13; 430/495.1; 430/945; 369/283; 369/288
(58) Field of Search ................................ 428/64.1, 64.2, 428/64.4, 64.5, 64.6, 457, 913; 430/270.13, 495.1, 945; 369/283, 288

(56) References Cited

U.S. PATENT DOCUMENTS 5,681,632 * 10/1997 Kitaura ................................ 428/64.1
5,965,229 * 10/1999 Zhou .................................... 428/64.4
6,042,921 * 3/2000 Yoshinari ............................ 428/64.1
6,203,877 * 2/2001 Okubo ................................. 428/64.1

FOREIGN PATENT DOCUMENTS 6-60423   3/1994   (JP) .

OTHER PUBLICATIONS

T. Ohta, et al., Japanese Journal of Applied Physics, vol. 28, Supplement 28–3, pp. 123–128, "Phase Change Disk Media Having Rapid Cooling Structure", 1989.

* cited by examiner

Primary Examiner—Elizabeth Evans
(74) Attorney, Agent, or Firm—Oblon, Spivak, McClelland, Maier & Neustadt, P.C.

(57) ABSTRACT

In a phase change optical recording medium, by determining heat conductivity relatively higher in one of interference layers on and under the recording layer, heat absorbed into the recording layer can be released moderately through an interference layer. Thereby, cross erasure caused by heating of adjacent tracks can be prevented, and at the same time, excessive heat radiation is prevented from a part of the recording layer nearer to the substrate to thereby maintain appropriate heat in the recording layer. As a result, cross-erasure is prevented, and data can be rewritten with the supply of typical recording/erasure power.

14 Claims, 7 Drawing Sheets

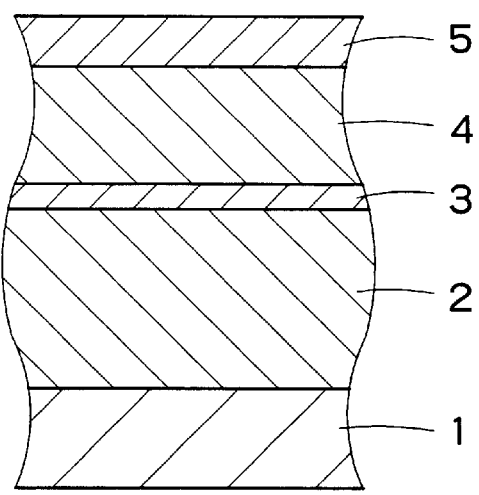
F I G. 1A
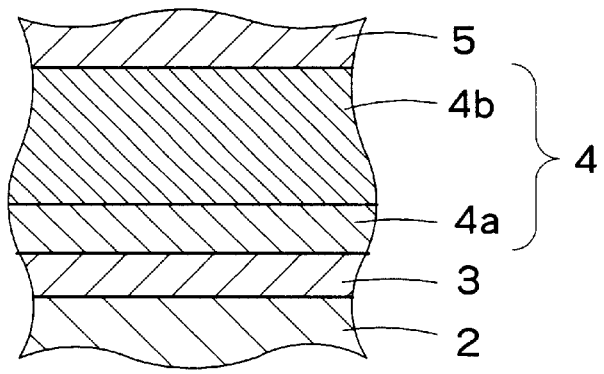
F I G. 1B
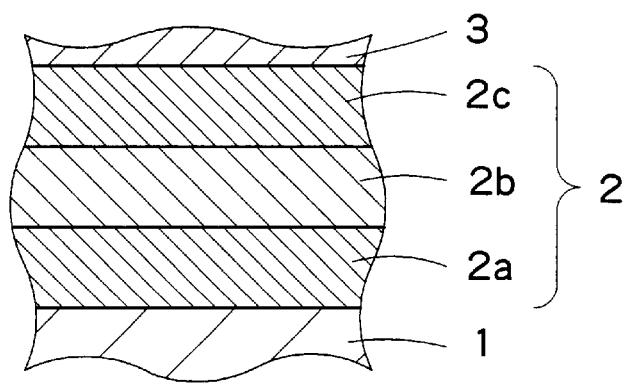
F I G. 1C

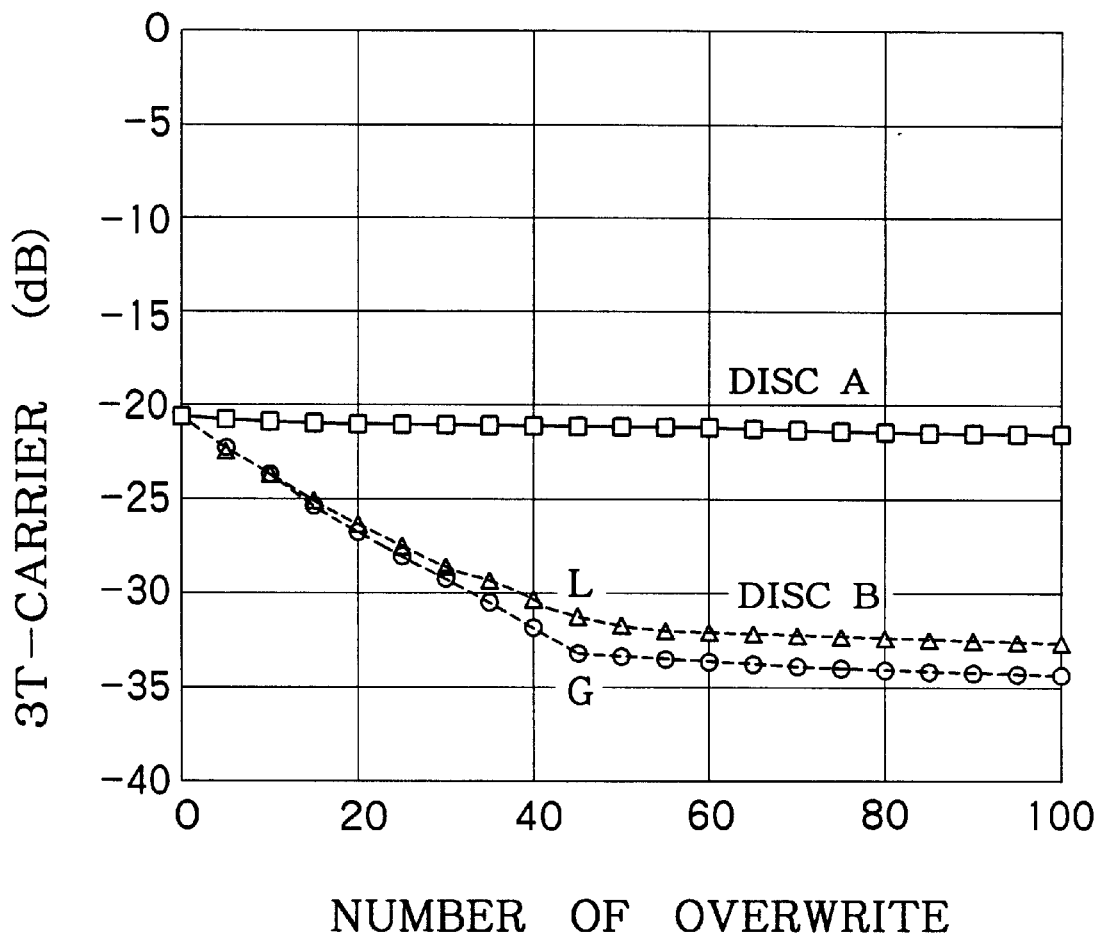
F I G. 3

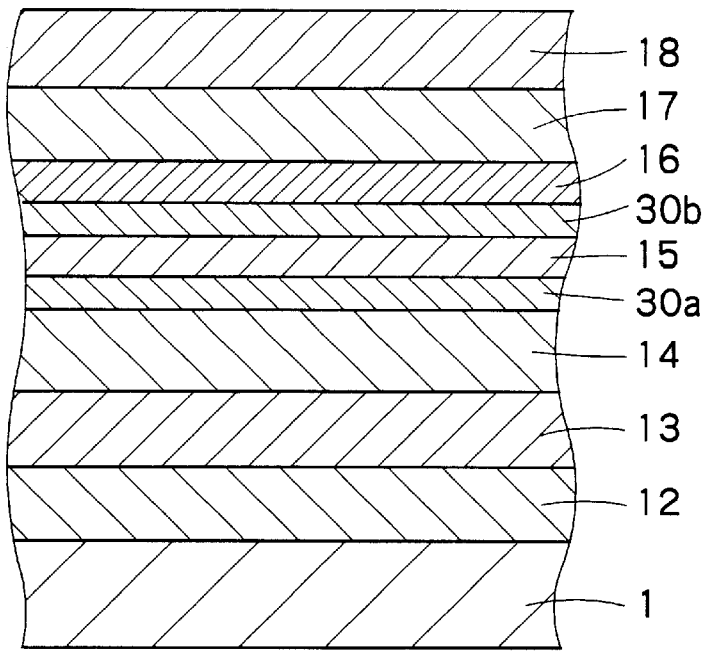
F I G. 4A
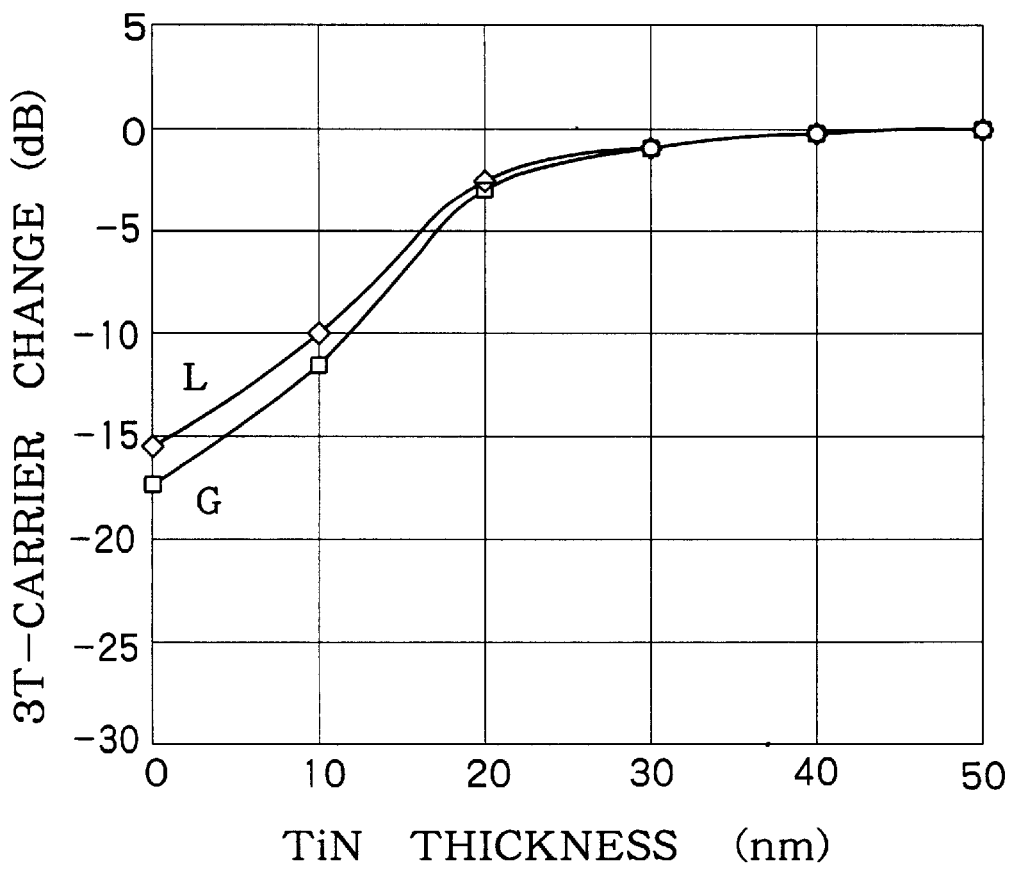
F I G. 4B

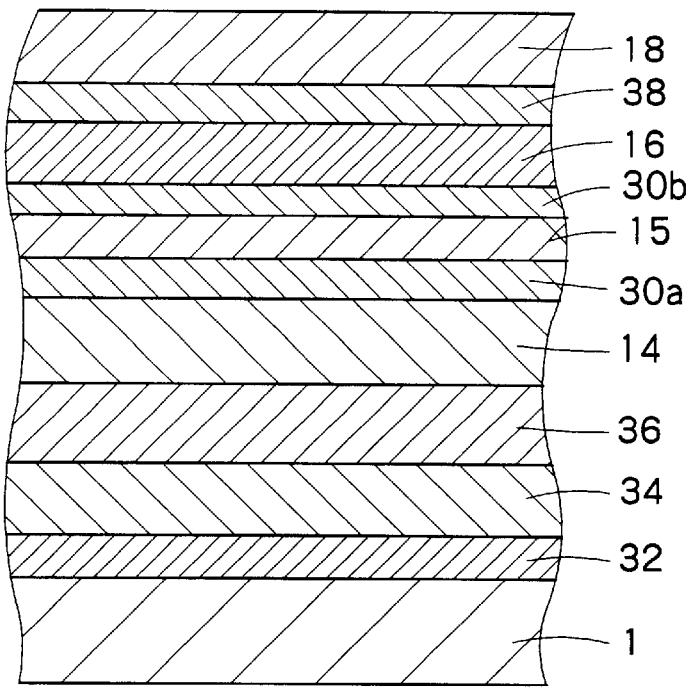
F I G. 5A
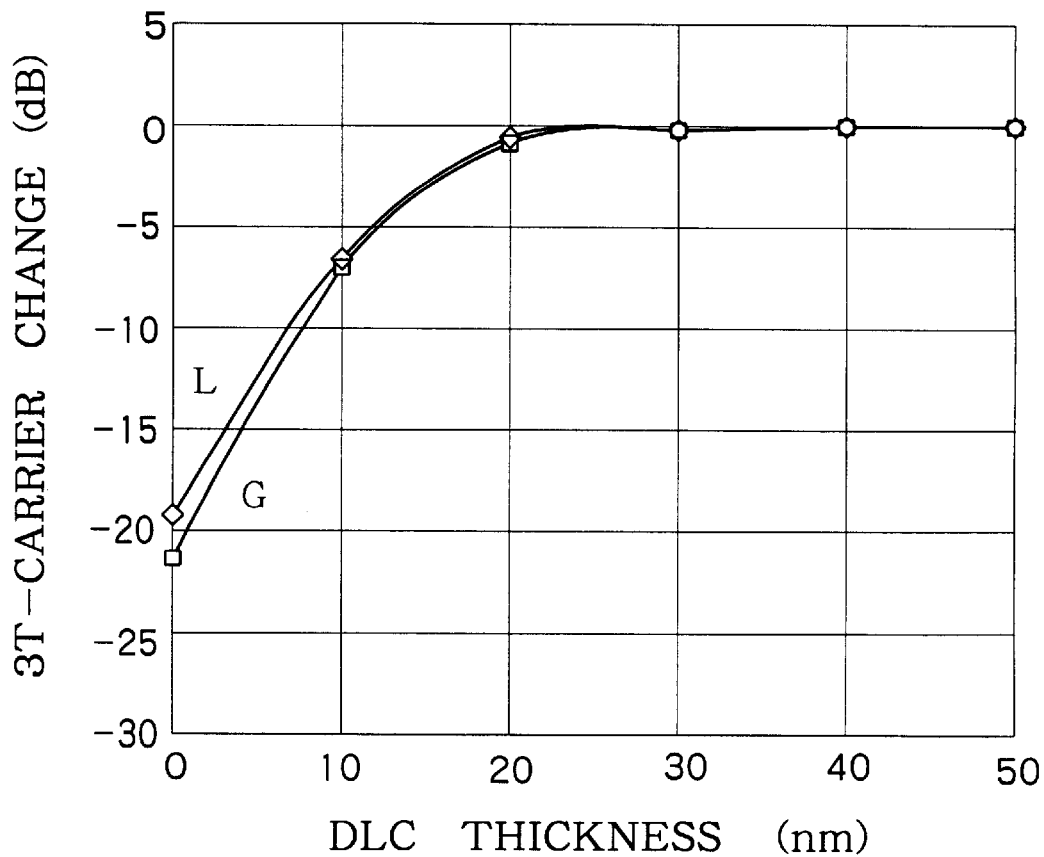
F I G. 5B

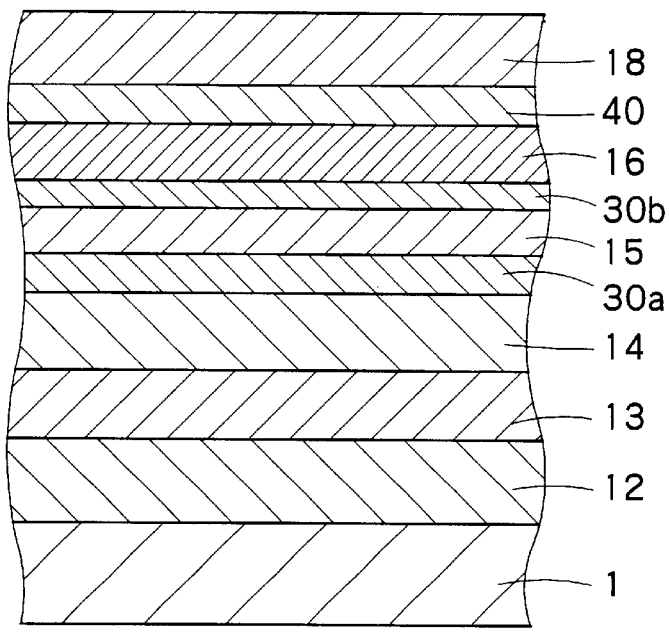
F I G. 6A
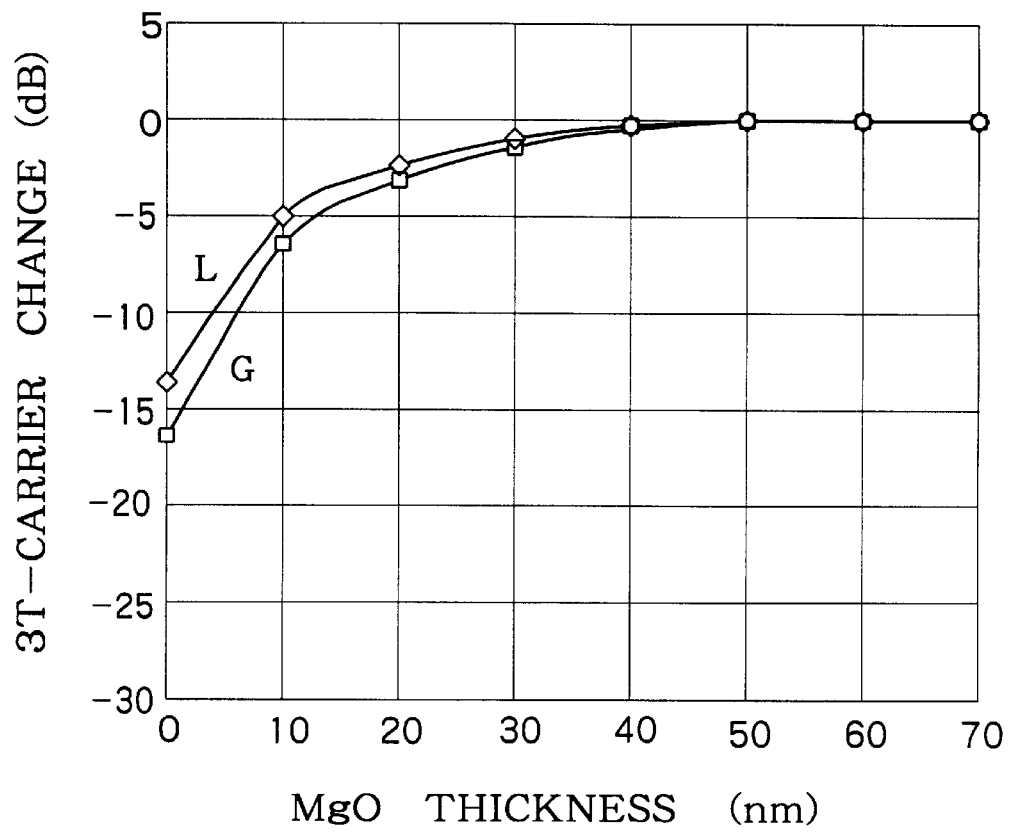
F I G. 6B

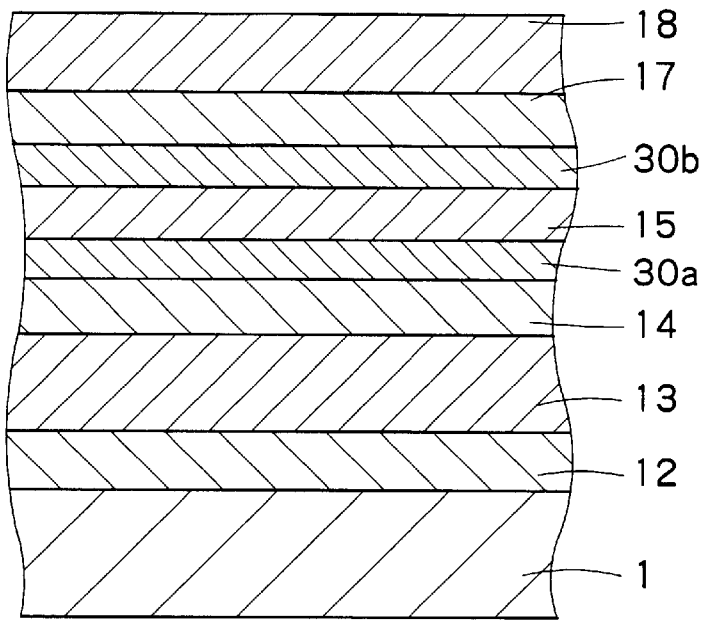
F I G. 7A
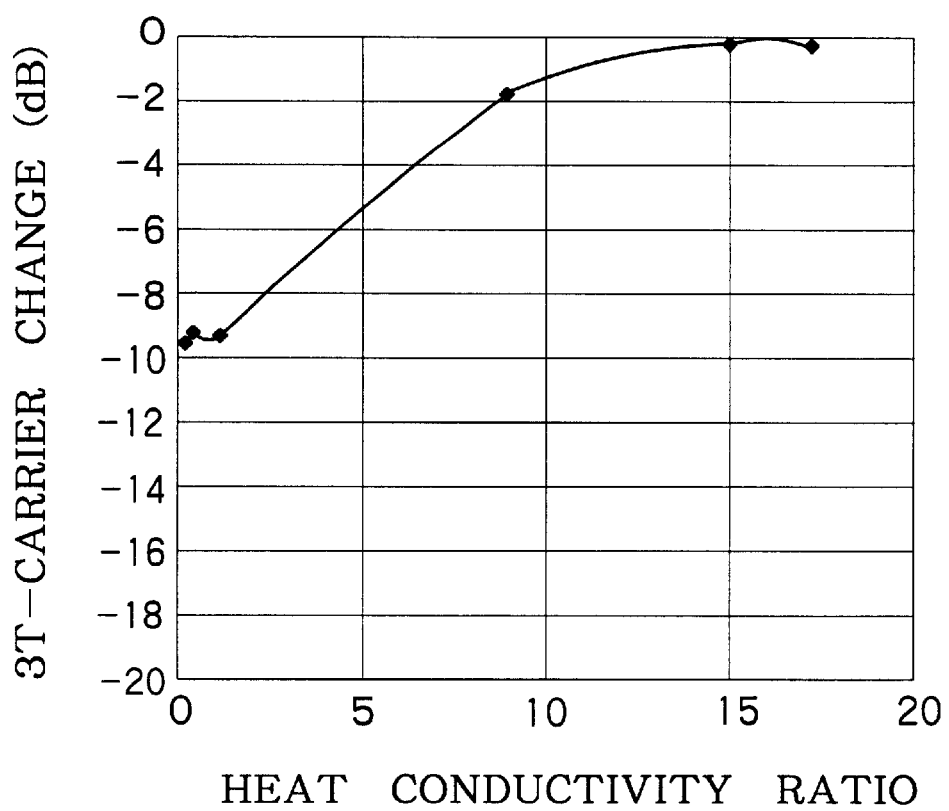
F I G. 7B

OPTICAL RECORDING MEDIUM

BACKGROUND OF THE INVENTION

This invention relates to an optical recording medium and more particularly, to a phase change optical recording medium configured to record and reproduce information thereon by irradiating laser light and having an excellent cross erasure property.

Optical recording mediums for recording and reproducing information by irradiating laser beams are large-capacity storage mediums satisfying the demands for a large capacity, quick accessibility and portability, which support the today's prosperity of personal computers. Among them, phase change optical recording mediums are recently being brought into practical use because of their simple recording principle. Explained below is an optical disc as an example of optical recording mediums.

The principle of recording and reproducing information on or from phase change optical recording mediums lies in irradiating semiconductor laser light onto a recording layer on a substrate and thereby reversibly change the status of a recording portion between amorphous and crystal phases. That is, upon recording data, a relatively high-power, short-pulse laser beam is irradiated onto a recording material to heat the recording portion to its melting point and thereafter rapidly cooling it to make an amorphous "recording mark". Upon reproducing data, a change in reflectance in the recording portion is read out as recording information. Upon erasing data, a lower-power, longer-pulse laser beam than the laser beam used during recording is irradiated onto the recording material to maintain that portion under a temperature not lower than the crystallizing temperature and lower than the melting point to crystallize it.

In this manner, when a phase change optical recording medium is used, it is sufficient to read out a change in reflectance between amorphous and crystalline states, and the optical system can be arranged easily. Additionally, phase change optical recording mediums have further advantages that they need no magnetic field which is inevitable in case of magneto-optical recording mediums, overwriting by optical intensity modulation is easy, and data transfer speed is high. Furthermore, they are well compatible with CD-ROM (compact disc-read only memory) and other existing discs exclusive for reproduction.

For improving the recording density of a phase change optical disc, there are various possible ways, such as decreasing the distance between recording marks, reducing the size of each recording mark, using a light source of a shorter wavelength, and others. As the method of decreasing the distance between recording marks, among those approaches, so-called "land groove (L/G) recording system and "mark length recording system", for example, have been proposed. The L/G recording system relies on recording data on both the "land track" "and the groove track" of an optical disc, and a high density approximately twice the conventional one can be expected with this system. The mark length recording system relies on detecting a change in reflectance in an edge portion of the recording mark (differential component of the reflectance), and a high density approximately 1.5 times the density of a conventional mark position recording method can be expected. If a super resolution technique proposed for ROM mediums is used in addition to these high-density recording techniques, it is expected that the current recording density of approximately 1.5 Gbpsi (bits/inch$^2$) can be increased to 10 through 20 times.

Furthermore, it is considered effective for increasing the density to shorten the wavelength of the light source. In case of constricting a laser light source by using an optical lens, the minimum spot depends on the wavelength of the light source, and the light spot can be diminished as the wavelength becomes shorter. That is, the recording density can be increased in inverse proportion to the wavelength of the light source.

As reviewed above, phase change optical recording mediums have the possibility for a higher density. However, for enabling rewriting over or beyond tens thousands times, there still remain a lot of problems to be solved. That is, although the L/G recording system is an indispensable technique for increasing the track density, the problems of "cross erasure" and "cross talk" become noticeable as the inter-track distance becomes narrower. Both these problems are caused by the beam diameter being large relatively to the track width (diameter of the beam intensity e$^{-2}$ is 0.92 $\mu$m). Cross erasure is the phenomenon that a light beam irradiated onto a track to record data thereon undesirably erases a part of recorded marks in an adjacent track. This is a serious problem in destroying information to be maintained. Cross talk is the phenomenon that a light beam irradiated onto a track to reproduce information thereon undesirably reads out information on an adjacent track as well, and it directly leads to a reproduction error. Both these phenomena become noticeable together with the increase of track density, and must be solved preferentially to all for movements toward improvements of the recording density of recording mediums.

SUMMARY OF THE INVENTION

The invention has been made under the recognition of those problems. It is therefore an object of the invention to provide a phase change optical recording medium which prevents cross erasure liable to occur more often along with an increase of the track density and therefore exhibits a stable overwrite property.

According to the invention, there is provided an optical recording medium comprising:

a first interference layer;

a recording layer provided on the first interference layer and changeable between crystalline and amorphous states when light is irradiated; and a second interference layer provided on the recording layer, mean heat conductivity of the first interference layer and mean heat conductivity of the second interference layer being different by not less than 10 times.

In the optical recording medium summarized above, since the heat absorbed by the recording layer is released moderately through the interference layer having a high heat conductivity, cross erasure can be prevented effectively.

The optical recording medium may further include a substrate underlying the first interference layer and having an optical transmittance, and a reflection layer overlying the second interference layer. In this case, by adjusting mean heat conductivity of the first interference layer higher than mean heat conductivity of the second interference layer, the heat absorbed by the recording layer can be released through the interference layer nearer to the substrate.

Alternatively, when the optical recording medium further includes a substrate underlying the first interference layer and having an optical transmittance, and a reflection layer overlying the second interference layer, by adjusting mean heat conductivity of the second interference layer higher than mean heat conductivity of the first interference layer, the heat absorbed by the recording layer can be released through the interference layer to the reflection layer.

The first interference layer may be a multi-layered film stacking at least two kinds of layers made of materials different in dielectric constant.

The second interference layer may be a multi-layered film stacking at least two kinds of layers different in material, combining a protective layer or a crystallization promoting layer with a layer higher in heat conductivity, so as to prevent cross erasure and at the same time maintain reliability and erasure property of the medium.

Each of the first interference layer and the second interference layer may have an extinction coefficient not higher than 0.5 to prevent absorption of the laser light and improve the efficiency.

According to the invention summarized above, by using a material with a high heat conductivity as the material for one of the interference layers at opposite sides of the recording layer, the heat absorbed by the recording layer can be released adequately, and cross erasure can be prevented accordingly.

As a result, the invention can provide an optical recording medium minimizing cross erasure and also preventing post-overwrite jittering even when employing the L/G recording system advantageous for high density recording.

Additionally, according to the invention, by using a multi-layered film including a plurality of layers different in refractive index or extinction coefficient as the interference layer between the substrate and the recording layer, a LtoH medium giving ample design choice in layer structures can be realized. That is, the invention provides freedom in selecting an appropriate thermal structure as well in addition to mere improvement of optical characteristics.

Furthermore, the invention promises the same effects even with HtoL mediums.

As reviewed above, the invention can provide high-performance phase-change optical recording mediums, and its industrial advantages are great.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIGS. 1A through 1C are diagrams showing cross-sectional structures of an optical recording medium according to the invention;

FIGS. 2A and 2B are diagrams showing cross-sectional structures of optical discs prepared in relation to the first example of the invention, in which FIG. 2A shows an optical disc A according to the invention whereas FIG. 2B shows a conventional optical disc B;

FIG. 3 is a graph diagram showing 3T-carrier levels obtained by the first example;

FIG. 4A is a cross-sectional view roughly showing the structure of a disc according to the second example of the invention;

FIG. 4B is a graph diagram showing changes in 3T carriers obtained on land tracks (L) and groove tracks (G) of discs as shown in FIG. 4A;

FIG. 5A is a cross-sectional view roughly showing the structure of a disc according to the third example of the invention;

FIG. 5B is a graph diagram showing changes in 3T carriers obtained on land tracks (L) and groove tracks (G) of discs according to the third example;

FIG. 6A is a cross-sectional view roughly showing the structure of a disc according to the fourth example of the invention;

FIG. 6B is a graph diagram showing changes in 3T carriers obtained on land tracks (L) and groove tracks (G) of discs according to the fourth example;

FIG. 7A is a cross-sectional view roughly showing the structure of a disc according to the fifth example of the invention; and FIG. 7B is a graph diagram showing changes in 3T carriers obtained on land tracks (L) and groove tracks (G) of discs according to the fifth example.

DETAILED DESCRIPTION OF THE PREFERRED EMBODIMENTS

Figure 2A:
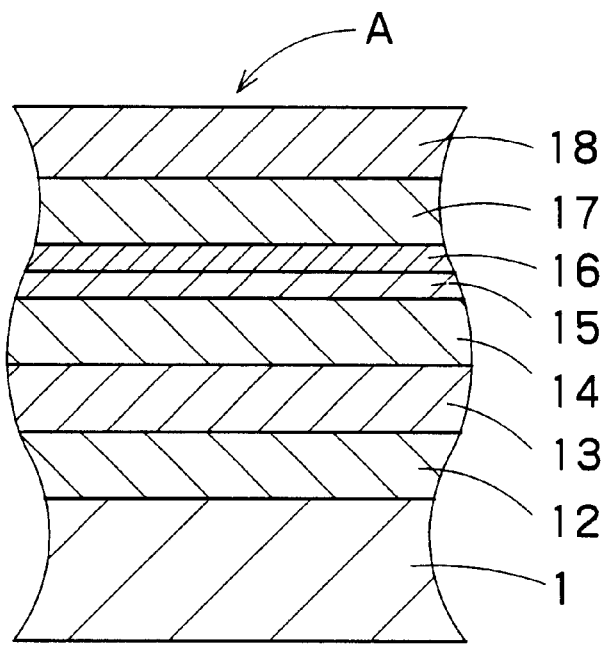

Explained below are embodiments of the invention with reference to the drawings.

FIGS. 1A through 1C are diagrams schematically showing cross-sectional structures of an optical recording medium according to the invention. FIG. 1A shows the entire structure of the optical recording medium, and FIGS. 1B and 1C shows structures of its major parts.

The optical recording medium according to the invention is made up of an interference layer 2, recording layer 3, interference layer 4 and reflection layer 5 sequentially stacked on a substrate 1 as shown in FIG. 1A. In recording and reproduction modes, laser light is irradiated through the substrate 1.

The substrate 1 is typically made of an optically transparent material such as polycarbonate (PC), and its address portion and data portion are pre-formatted.

The recording layer 3 is made of a material variable in phase with irradiation of light, and recorded marks are formed thereon. It will be explained later in greater detail.

The interference layers 2, 4 and the reflection layer 5 have the role of preventing oxidation of the recording layer 3, preventing deterioration thereof due to cumulative overwriting, adjusting the thermal response thereof during recording, optically enhancing it during reproduction, and so on. Regarding the optical enhancement effect, in particular, the lower interference layer 2 utilizes multiple interfering effects between the substrate 1 and the recording layer 3, and the upper interference layer 4 utilizes multiple interfering effects between the recording layer 3 and the reflection layer 5, thereby to increase changes of the reflectance of the recording layer in quantity and improve the quality of signals.

Each of these interference layers 2 and 4 may be either a single layer or a multi-layered film stacking a plurality of layers different in material, as explained later in detail.

Reflectance (Ra) of an amorphous mark can be freely determined higher or lower than the reflectance of the crystalline area (Rc), depending on the thickness of each layer. When the reflectance of the amorphous areas is higher, and the reflectance of the crystalline area is lower, it is called "low to high (LtoH)". In the opposite case, it is called "high to low (HtoL)".

Similarly, absorptance of the amorphous mark (Aa) can be freely selected higher or lower than the absorptance of the crystalline areas (Ac).

One of features of the first embodiment of the invention is that the heat conductivity of the interference layer 4 between the recording layer 3 and the reflection layer 5 is higher than the heat conductivity of the interference layer 2 between the substrate 1 and the recording layer 3. When the interference layers 2 and 4 have multi-layered structures, the heat conductivity is defined by an arithmetic mean, considering importance to thickness of each layer. Ratio of the heat conductivity of the interference layer 4 and to the heat conductivity of the interference layer 2 is preferably 10 or more.

A cause of cross erasure during L/G recording probably lies in that the heat absorbed into the recording layer upon irradiation of laser light spreads along the plane of recording layer and increases the temperature of the recording layer in an adjacent track portion. In contrast, according to the embodiment of the invention, by setting the heat conductivity of the interference layer 4 higher, the heat once absorbed into the recording layer 3 can be released to the reflection layer 5. Since the reflection layer 5 is made of a material having a very high heat conductivity, such as gold (Au) or aluminum (Al) alloys, it functions as a remarkably effective "heat sink" for the heat transmitted through the interference layer 4.

If heat radiation only to the reflection layer 5 is taken into account, heat dissipation is more effective when the interference layer 4 is thinner. In optical recording mediums, however, the thickness of the interference layer 4 is generally determined so as to ensure optical characteristics and protection of the recording layer. In contrast, according to the embodiment of the invention, by setting the heat conductivity of the interference layer 4 higher, heat dissipation can be improved while maintaining a predetermined thickness of the layer.

On the other hand, if the heat absorbed into the recording layer 3 is released too much, the recording layer 3 cannot be heated sufficiently enough to ensure recording or erasure of data. In contrast, according to the embodiment of the invention, by setting the heat conductivity of the interference layer 2 nearer to the substrate relatively lower, radiation of heat from the recording layer 3 can be adjusted appropriately. That is, by releasing heat from the recording layer 3 via the interference layer 4, cross erasure by unintentional heating of an adjacent track portion can be prevented, and at the same time, in a part of the recording layer nearer to the substrate, moderate heat storage in the recording layer is ensured by preventing excessive heat radiation.

That is, the invention enables both preventing cross erasure and rewriting data with typically power for recording and erasure.

Next made is more detailed explanation about the interference layer 4 interposed between the recording layer 3 and the reflection layer 5.

FIG. 1B is a diagram illustrating a cross-sectional structure of the interference layer 4. The interference layer 4 may be either a single layer or a multi-layered structure as illustrated here. That is, in the example shown here, the interference layer 4 includes a layer 4a in contact with the recording layer 3 and a layer 4b stacked thereon. The layer 4a is a protective layer for physically or chemically protecting the recording layer, for example. The layer 4a is preferably made of a material similar to that of the recording layer in thermal expansion coefficient and other physical properties, or a material effective for preventing deterioration of the recording layer due to oxidation, or the like. More specifically, as explained later taking examples, the layer 4a may be made of a mixture of ZnS and $SiO_2$ ($ZnS$-$SiO_2$ layer), for example.

A material having the function of promoting crystallization of the recording layer is also usable as the material of the layer 4a. Specifically, as explained later taking examples, the layer 4a may be made of GeN, for example.

The layer 4a may be omitted if appropriate. If the overlying layer 4b is bonded closely enough to protect the recording layer 3 physically and chemically, the layer 4a may be omitted.

The layer 4b is made of a material with a high heat conductivity. The material preferably has a higher heat conductivity that that of the interference layer 2 which will be explained later in greater detail. At the same time, the layer 4b is required to have a small extinction coefficient and a high transmittance to laser light. Any material satisfying these conditions may be used among dielectric materials, semiconductors, metals and other. It is also acceptable to use a material made by spreading fine particles of a dielectric material, metal or semiconductor into a matrix of a different dielectric material, metal or semiconductor.

Preferable examples thereof are AlN, TiN, GeN, HfN, ZrN, TaN, VN, $Si_3N_4$, BN, $Al_2O_3$, CaO, MgO, NiO, TiO, C, HfC, NbC, TaC, TiC, ZrC, and any complex of them. In case of C (carbon), any of its allotropes, namely, diamond, amorphous carbon and diamond-like carbon, is suitable.

Thickness of the interference layer 4 made of such a material is generally determined by optical properties required for the recording medium. Although the thickness also depends on the heat conductivity and thickness of the reflection layer 5, it is preferably not less than 10 nm and not more than 100 nm to promote quick heat dispersion into the reflection layer 5.

Next explained is the interference layer 2 interposed between the substrate 1 and the recording layer 3.

FIG. 1C is a diagram illustrating a cross-sectional structure of the interference layer 2. The interference layer 2 has the role of adjusting optical characteristics and thermal characteristics of the recording medium in addition to the role as a protective layer of the recording layer 3. To reconcile optical characteristics and thermal characteristics, the interference layer 2 preferably has a multi-layered structure including two or more layers.

By using a multi-layered structure as the interference layer 2, optical characteristics and thermal characteristics can be optimized simultaneously. For example, as shown in FIG. 1C, when the interference layer 2 is a multi-layered structure including a first layer, second layer and third layer which are different in dielectric constant, a LtoH medium satisfying thermal characteristics and optical characteristics altogether can be realized. That is, the interference layer 2 contributes to providing not only ample design choice for the layer structure but also ample freedom in the thermal structure in addition to mere improvement of optical characteristics. The same effects can be obtained with HtoL mediums as well.

In this case, the first to third layers of the interference layer 2 are related in terms of refractive index so that every two adjacent layers have different dielectric constants. Therefore, when expressing their stacking order in value of their refractive indices, various stacking orders such as large/small/large, small/large/small, large/medium/small, or large/medium/small are employable. Alternatively, they may be stacked to vary in extinction coefficient k alone instead of refractive index. However, in order to ensure an optical transmittance to laser light, the extinction coefficient k of the interference layer 2 is preferably 0.5 or less.

On the other hand, the number of layers forming the interference layer 2 is not limited to two, and four or more layers may be stacked. That is, in FIG. 1C, a protective layer or crystallization promoting layer, not shown, may be interposed between the layer 2c and the recording layer 3.

Examples of materials usable as respective layers of the multi-layered structure forming the interference layer 2 are dielectric materials which are compounds of, for example, Cr, Nb, V, Ta, Ti, W, Hf, Cr, In, Si or B with at least one element selected among oxygen, nitrogen, carbon and hydrogen. More specifically, there are compounds expressed by the general formula M-G, for example. M is at least one element selected from the group consisting of Si, Al, Zr, Ti, In, Sn and B whilst G is at least one element selected from the group consisting of oxygen, nitrogen and carbon. Specific examples of such materials are Si—O, Al—O, Zr—O, Ti—O, Si—N, Al—N, Zr—N, Ti—N, B—N, Si—C, Ti—C, B—C, SiAl—ON, Si—ON, AlTi—OC, and In—Sn—O. Allotropes of carbon, namely, diamond, amorphous carbon and diamond-like carbon, are also suitable. For example, dielectric film materials such as $Ta_2O_5$, $Si_3N_4$, $SiO_2$, $Al_2O_3$, AlN, etc. are usable.

Also usable are semiconductor materials, such as independent elements like Ge, Se, Sn and Te, III–V compounds like AlSb, GaAs, InAs and InSb, II–VI compounds like CdO, CdS, ZnO and ZnS, GeN, and their mixed materials, and metal materials such as silver (Ag), copper (Cu), aluminum (Al), Cr, Nb, V, Ta, Ti, W, Hf, In, Si and B. Additionally, films made of a matrix of a dielectric material, metal or semiconductor containing fine particles of a different dielectric material, metal or semiconductor dispersed therein.

Through researches, the Inventor confirmed that the use of ZnS, ZnO, SiO, $Al_2O_3$, $Cu_2O$, CuO, TaO, $Y_2O_3$, $ZrO_2$, $CaF_2$, $MgF_2$, $Si_3N_4$, GeN or any complex of them is desirable.

Refractive n index of each layer is preferably in the range from 1.5 to 1.7. Since refractive indices of thin films largely vary with deposition methods, the said refractive index is preferably measured by ellipsometry. There are various possible combinations of thicknesses of respective layers of the multi-layered structure forming the interference layer 2 from the viewpoint of optical design. However, the total thickness is preferably not thicker than 300 nm. By appropriately combining thicknesses of these layers, it is possible to desirably realize the polarity of so-called, "low to high (LtoH)" in which the reflectance is higher in amorphous areas and lower in crystalline areas, or the opposite polarity, "high to low (HtoL)".

As explained above with reference to FIGS. 1A through 1C, the phase change optical disc according to the embodiment has the interference layer 4 with a relatively high heat conductivity and the interference layer 2 with a relatively low heat conductivity. To realize more excellent characteristics, the ratio of the heat conductivity of the former relative to the heat conductivity of the latter is preferably 10 or more. When any of the interference layer has a multi-layered structure, the heat conductivity of the entirety is defined by an arithmetic mean, attaching importance to thicknesses of respective layers. For example, when the interference layer 4 having a higher heat conductivity is made of an AlN (heat conductivity: 29 J/msK) layer alone, as shown in FIG. 1A, and the interference layer 2 having a lower heat conductivity has the three-layered structure (heat conductivity: 1.3 J/msK) made up of the $ZnS$-$SiO_2$ layer, $SiO_2$ layer and $ZnS$-$SiO_2$ layer as shown in FIG. 1C, effects of the invention are obtained sufficiently.

Each said material preferably has a low optical absorptance, and its extinction coefficient k is preferably 0.5 or less. The extinction coefficient k largely depends on the deposition method, and a desired extinction coefficient can be obtained by selecting an appropriate deposition method suitable for each material.

As explained above, according to the first embodiment of the invention, by setting the heat conductivity of the interference layer 4 higher than that of the interference layer 2, heat absorbed into the recording layer 3 can be release moderately to the reflection layer 5, and cross erasure can be prevented accordingly.

Next explained is the second embodiment of the invention.

In the second embodiment of the invention, heat conductivity of the interference layer 2 is higher than that of the interference layer 4. In this case, heat radiation to the reflection layer cannot be expected. However, the interference layer 4 is required to be relatively thick, heat radiation effect is obtained to a certain extent. Additionally, moderate heat dissipation is realized on the incident side of laser light. In the embodiment shown here, one of materials proposed in the first embodiment as materials of the interference layer 4 is preferably used to form a part of the interference layer 2. When the heat conductivity of the interference layer 2 is higher, the interference layer 4 may be made of a conventionally used material, such as $ZnS$-$SiO_2$, for example. In this manner, to the contrary from the former case, heat radiation can be promoted by the interference layer 2 whilst excessive heat radiation can be prevented by the interference layer 4.

Through researches, the Inventor found that it is effective to use a three-layered structure as shown in FIG. 1C as the interference layer 2 and to set the heat conductivity of the layer adjacent to the recording layer (layer 2c in FIG. 1C) relatively lower. That is, when the interference layer 2 has a three-layered structure in which heat conductivities of layers 2a, 2b and 2c of the interference layer 2 are combined as low/high/low or high/high/low, heat released from the recording layer is spread and radiated in the layers 2b and 2a distant from the recording layer in a direction parallel to the layer. The layer 2b is not adjacent to the recording layer, but the layer 2c having a low heat conductivity exists between them. Probably, this prevents the problem that the recording layer is again heated by the layer 2b.

In any of the first and second embodiments, used as the material of the recording layer is one reversibly changing between crystalline and amorphous states upon irradiation of light and different in optical property between these states. Chalcogenite metal compounds, namely, GeSbTe, InSbTe, SnSeTe, GeTeSn, InSeTlCo, and materials obtained by adding to them a small amount of Co (cobalt), Pt (platinum), Pd (palladium), Ag (silver), Ir (iridium), Nb (niobium), Ta (tantalum), V (vanadium), W (tungsten), Ti (titanium), Cr (chromium), Zr (zirconium), N (nitrogen), etc. can be used as the recording layer having excellent characteristics.

Layers of the phase change optical recording medium according to the invention may be made by typical physical vapor deposition. That is, they can be made by RF/DC sputtering and any other deposition methods such as electron beam vapor deposition, resistance heating vapor deposition and molecular beam epitaxy (MBE).

For controlling heat conductivities and optical constants of the interference layers 2 and 4, a certain effect is obtained also in their deposition processes. For example, when thin films of a nitride are made by RF sputtering, films different in heat conductivity and optical constant can be obtained by appropriately adjusting the RF output, pressure of the sputtering gas, added amount of nitrogen, etc. If surface morphology is improved by bias-sputtering each film surface, its heat conductivity can be changed to a certain extent.

As explained above, by adjusting relative heat conductivity of the interference layer between the recording layer and the reflection layer, and the interference layer between the substrate and the recording layer, a phase change optical recording medium permitting L/G recording with a high recording density can be obtained.

The measurement of the thermal conductivity of the interference layers can be carried out by the "high-speed time-resolved (picosecond) thermoreflectance technique". This is a technique developed by Baba et al., Ministry of International Trade and Industry, Industrial Technology Department, National Research Laboratory of Metrology. Measurement System Department, Measurement Information Section. The details of the technique is disclosed in, e.g., Proc. Thermophysical Properties 17, p43, Prc. EURO-THERM '57 "Microscale Heat Transfer".

This measuring method utilizes light and heat material properties that the reflectance of a material depends on the temperature of the material. The variation in reflectance of a material with respect to temperature depends on the kind of the material. For example, in the case of Al, the variation in absolute reflectance is about $10^{-5}$ ($K^{-1}$). This phenomenon can be physically explained as the variation in thermal reflectance caused by the fact that the thermal oscillation of a lattice has a slight influence on the electronic state thereof. In this measuring method, a pump light beam having a pulse width of about picoseconds is used as means for heating the surface of a material. When the material is irradiated with a pulse light beam, the surface temperature of the material rises, and the reflectance thereof varies, generally increases. When the pump light beam is turned off, heat is diffused in a direction of the thickness of the sample from the surface thereof, so that the surface temperature falls and the reflectance decreases. In the case of a thin-film sample having a thickness of tens nm (nanometers), the time constant of a thermal diffusion in a direction of the thickness of the film depends on the thermal conductivity of the film, and has a value between tens picoseconds and several nanoseconds. When the variation in surface reflectance after turning off the pump light beam is monitored by a probe light beam having a low power, by which the surface is not substantially heated, the time constant of a thermal diffusion in a direction of the thickness of the film is measured. If this time constant is converted into the thermal permeability in a direction of the thickness of the film and if the resulting thermal permeability is converted into a thermal conductivity (which is assumed as a linear thermal conduction in a direction of the thickness of the film), it is possible to derive the value of the heat conductivity.

The high-speed time-resolved (picosecond) thermoreflectance technique method is the only technique capable of accurately measuring the thermal conductivity of a thin-film sample having a thickness of tens nm (nanometers). The reliability of the measured value is far higher than, e.g., the "Alternating Current (AC) Calorimetric method" which has been used well. Originally, the Alternating Current (AC) calorimetric method was developed in order to measure the thermal conduction of a film sample having a thickness of hundreds μm (micrometers). However, there was no measuring method suitable for a thin-film sample having a thickness of tens to hundreds nm (nanometers), so that the Alternating Current (AC) calorimetric method had to be applied to a thin-film. An example of the thermal conductance of a film material for use in a phase change recording medium, which was measured by the Alternating Current (AC) calorimetric method, is disclosed in, e.g., Jpn. Appl. Phys. 28–3, pp.123–128. As the measured value of the thermal conductivity of an amorphous part of a GeSbTe recording layer relating to this preferred embodiment, a value of 0.58 W/mK is clearly described. This measured value is very doubtful in respects of the facts that this measured value is lower than the thermal conductivity of $ZnS$—$SiO_2$ disclosed in the same literature, that the measured value is the same as the thermal conductivity of the crystal part of the GeSbTe film, and that the measured value is far lower than the bulk thermal conductivity of each of Ge, Sb and Te.

The inventor has reexamined measurement by the Alternating Current (AC) calorimetric method. However, the measured value of a sample having a thickness of tens nm for use in an actual phase change recording medium varied widely, so that it was not possible to carry out significant measurement at all. Moreover, also with respect to the measurement of a sample having a thickness of tens μm (micrometers), to which the Alternating Current (AC) calorimetric method was able to be applied, the dispersion in measured value exceeded plus and minus tens %, so that it was difficult to acquire reliable data.

On the other hand, as described above, the high-speed time-resolved (picosecond) thermoreflectance technique method is designed to carry out the high-speed time-resolved measurement of the thermal diffusion in a direction of the thickness of a sample, and to observe the variation in reflectance of the surface of the sample by a probe light beam in picosecond order after heating the surface of the sample by a pump light beam. This is a technique for precisely measuring behavior wherein when heat is diffused in a direction of the thickness of a sample after heating the surface of the sample, the surface temperature thereof falls and the thermal reflectance thereof decreases. This is a technique useful for all of film materials although the precision of measurement is particularly high with respect to a material having a high thermal reflectance, e.g., Al (aluminum). Because if an Al (aluminum) thin-film is coated on the surface of, e.g., even a transparent thin-film material having a low reflectance, the thermal conductivity of the transparent thin-film material can be known by examining the time varied temperature of the surface of the Al coated film in accordance with the thermal diffusion in a direction of the thickness of the transparent thin-film material.

Next explained are specific examples of the invention.

EXAMPLE 1

Disc A preventing cross erasure according to the invention and conventional disc B were prepared and compared for evaluation.

Figure 2B:
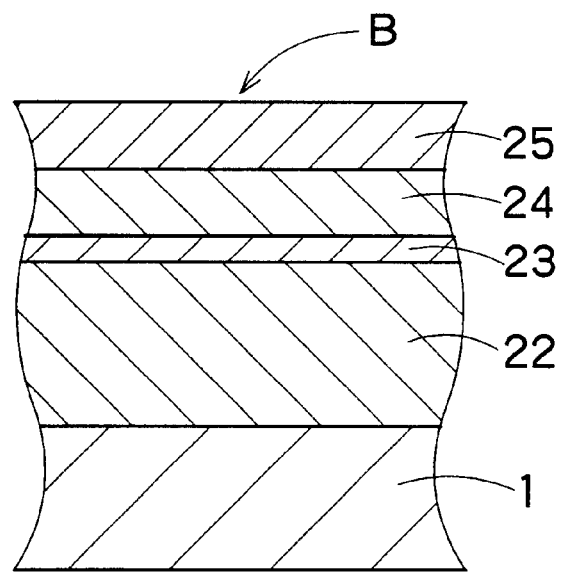

FIGS. 2A and 2B are schematic diagrams showing cross-sectional structures of optical discs prepared in relation to the example discussed here. FIG. 2A shows an optical disc A according to the invention, and FIG. 2B shows a conventional optical disc B.

The optical disc A according to the invention has a structure in which a 70 nm thick $ZnS(80\%)$—$SiO_2(20\%)$ layer 12, 100 nm thick $SiO_2$ layer 13, 70 nm thick ZnS $(80\%)$—$SiO_2(20\%)$ layer 14, 20 nm thick $Ge_{25}Sb_{23}Te_{52}$ recording layer 15, 10 nm thick $ZnS(80\%)$—$SiO_2(20\%)$ layer 16, 40 nm thick AlN layer 17, and 50 nm thick Au layer 18 are sequentially stacked on a PC substrate 1.

In the optical disc A according to the invention, the AlN layer corresponds to the layer with a higher heat conductivity. On the other hand, the $ZnS(80\%)$—$SiO_2(20\%)$ layer 16 interposed between the recording layer 15 and the AlN layer 17 functions as the protective layer of the recording layer. That is, since a thermal, chemical or physical stress is applied to the recording layer, the protective layer is preferably provided adjacent to it in order to maintain the reliability of the recording medium. The ZnS(80%)—SiO$_2$(20%) layer 16 is an optimum material for protecting the recording layer from the viewpoint of various physical properties such as heat conductivity, heat capacity, hardness, expansion coefficient, refractive index, and so on.

The conventional optical disc B has a structure in which 10 nm thick ZnS(80%)—SiO$_2$(20%) layer 22, 20 nm thick Ge$_{25}$Sb$_{23}$Te$_{52}$ recording layer 23, 50 nm thick ZnS(80%)—SiO$_2$(20%) layer 24, and 50 nm thick Au layer 25 are sequentially stacked on a PC substrate 1.

The optical disc A according to the invention was made by the following manufacturing process.

The PC substrate 1 was first introduced into a deposition apparatus, and the deposition chamber was evacuated to $5 \times 10^{-4}$ Pa or less. Thereafter, by applying RF power of 1 kW to a target of ZnS(80%)—SiO$_2$(20%), the ZnS(80%)—SiO$_2$(20%) layer 12 was stacked. After that, by applying RF power of 800 W to a SiO$_2$ target, the SiO$_2$ layer 13 was stacked up to the thickness of 100 nm, and by again applying RF power of 1 kW to the ZnS(80%)—SiO$_2$(20%) target, the 70 nm thick ZnS(80%)—SiO$_2$(20%) layer 14 was stacked.

After that, by applying RF power of 50 W to a Ge$_{25}$Sb$_{23}$Te$_{52}$ target, the 20 nm thick recording layer 15 was stacked. Next, by applying RF power of 1 kW to the ZnS(80%)—SiO$_2$(20%) target, the 10 nm thick ZnS(80%)—SiO$_2$(20%) layer 16 was stacked. Further, by applying RF power of 400 W to a AlN target, the 40 nm thick AlN layer 17 was stacked in the (Ar+10%N$_2$) gas atmosphere. Finally, by applying DC power of 200 W to a Au target, the 50 nm thick Au film 18 was stacked. After deposition of films, a 0.6 nm thick dummy PC substrate was bonded.

The conventional optical disc B was also prepared by a process similar to the process explained above. Both these discs A and B exhibited so-called LtoH polarities with a high reflectance in amorphous areas and a low reflectance in crystalline areas.

Conditions for evaluating discs are shown in Table 1

TABLE 1

Conditions for Evaluating Discs

| Conditions for Evaluation | Condition 1 | Condition 2 |
|---|---|---|
| Laser Reproducing Output | 1.0 mW | 0.5 mW |
| Laser Record/Erase Output | 3~5 mW | 2~11 mW |
| Wavelength of Light Source | 660 nm | 413 nm |
| Revolutions of Disc | 8.2 m/sec | 6 m/sec |
| NA of Object Lens | 0.6 | 0.65 |
| Track Pitch | 0.6 μm | 0.35 μm |
| Minimum Bit Length | 0.28 μm | 0.265 μm |
| Recorded Pattern | 3T~11T | 3T~14T |
| Modulation System | (8, 16) RLL | (8, 16) RLL |

Cross erasure was evaluated in the following process.

(1) 3T marks, which are the densest patterns, are overwritten (OW) ten times on a target track.

(2) 11T marks, which are the least dense patterns, are overwritten 1 through 100 times on adjacent tracks at opposite sides of the target track.

(3) Changes of 3T-carriers on the target track are monitored.

FIG. 3 is a graph diagram showing levels of 3T-carriers obtained by this evaluation method. It is noted from FIG. 3 that, in the conventional disc B, 3T-carrier decrease as the frequency of overwriting (OW) increases, and they decrease by 10 dB or more after 50 times of OW. In contrast, in case of the disc A according to the invention, it is noted that the decrease of 3T-carriers is maintained within 1 dB even after 100 times of Ow.

Additionally, as overall indices of discs, cross erase characteristics of random jitters obtained on groove tracks of each disc are shown in Table 2.

TABLE 2

Random Jitters of Discs A and B

| Frequency of OW | Disc A | Disc B |
|---|---|---|
| Once | 8.5% | 8.7% |
| 10 times | 8.8% | 15.6% |
| 100 times | 9.1% | 21.7% |

Referring to Table 2, in case of conventional discs B, jitters heavily increase with repetition of OW on adjacent tracks. In case of discs A according to the invention, jitters do not increase so much even after repeating OW hundred times on adjacent tracks. Thus, the invention could significantly improve cross erasure, and actually resulted in preventing increase of random jitters after several times of OW on tracks.

EXAMPLE 2

FIG. 4A is a cross-sectional view roughly showing the structure of a disc prepared in this example. That is, in substantially the same process as that of Example 1, sequentially stacked on a PC substrate 1 were a 150 nm thick ZnS(70%)—SiO$_2$(30%) layer 12, 30 nm thick Al$_2$O$_3$ layer (RF output of 1 kW) 13, 80 nm thick ZnS(70%)—SiO$_2$(30%) layer 14, 5 nm thick GeN layer (RF output of 250 W) 30$a$, 20 no thick Ge$_{22}$Sb$_{22}$Te$_{56}$ recording layer 15, 5 nm thick GeN layer 30$b$, ZnS(70%)—SiO$_2$(30%) layer 16, TiN layer 17, and 50 nm thick Au layer 18. The TiN layer 17 was deposited by sputtering in an (Ar+5%N$_2$) atmosphere under application of RF power of 1 kW to a TiN target.

This example is characterized in providing the GeN layers 30$a$ and 30$b$ on and under the recording layer 15 and stacking the ZnS(70%)—SiO$_2$(30%) layer 16 and the TiN layer 17 thereon as interference layers.

The GeN layers 30$a$ and 30$b$ function to protect the recording layer 15 and improve its erasure property. That is, the use of GeN layers 30$a$ and 30$b$ in contact with the recording layer 15 contributes to promoting generation of crystal cores in the recording layer 15 thereby to accelerate crystallization, and improving the erasability accordingly.

In this example, six kinds of discs were prepared by fixing the total thickness of the ZnS(70%)—SiO$_2$(30%) layer 16 and the TiN layer 17 on the GeN layer 30$b$ to 50 nm and changing the thickness of the TiN layer 17 from 0 to 50 nm.

As a result of forming them as discs in the same manner as Example 1, they exhibited reflectance of HtoL which is the opposite polarity from Example 1. For each disc, by conducting cross erasure evaluation under the evaluation condition 1 in Table 1, changes in 3T-carriers after hundred times of OW of 11T were evaluated.

FIG. 4B is a graph diagram showing changes in 3T carriers obtained on land tracks (L) and groove tracks (G) of each disc. As the thickness of TiN increases, changes in carriers decrease, and becomes substantially zero when and after the thickness increases to 40 nm. That is, as the TiN layer 17 becomes relatively thick, cross erasure is alleviated, and above 40 nm, the property is improved until no cross erasure is observed.

That is, it has been confirmed that, if the ratio of TiN with a high heat conductivity is increased in the interference layer between the recording layer 15 and the reflection layer 18, heat is moderately released from the recording layer 15, and cross erasure is suppressed.

EXAMPLE 3

FIG. 5A is a cross-sectional view roughly showing the structure of a disc prepared in this example. In substantially the same process as that of Example 1, sequentially stacked on a PC substrate 1 were a 10 nm thick Au (gold) layer (DC output of 100 W) 32, 60 nm thick $Si_3N_4$ layer (RF output of 1 kW) 34, 90 nm thick $CaF_2$ layer (RF output of 600 W) 36, 80 nm thick ZnS(70%)—$SiO_2$(30%) layer 14, 5 nm thick GeN layer (RF output of 250 W) 30a, 20 nm thick $Ge_{22}Sb_{22}Te_{56}$ recording layer 15, 10 nm thick GeN layer 30b, ZnS(70%)—$SiO_2$(30%) layer 16, DLC layer 38, and 100 nm thick AlTi layer (DC output of 1 kW) 18. The DLC layer 38 is a layer of diamond-like carbon made by CVD (chemical vapor deposition).

In this example, six kinds of discs were prepared by fixing the total thickness of the ZnS(70%)—$SiO_2$(30%) layer 16 and the DLC layer 38 on the GeN layer 30b to 50 nm and changing the thickness of the DLC layer 38 from 0 to 50 nm.

For each disc, by conducting cross erasure evaluation under the evaluation condition 1 in Table 1, changes in 3T-carriers after hundred times of OW of 11T were evaluated.

FIG. 5B is a graph diagram showing changes in 3T carriers obtained on land tracks (L) and groove tracks (G) of each disc. As the thickness of the DLC layer 38 increases, changes in carriers decrease, and becomes substantially zero when and after the thickness increases to 20 nm. That is, as the DLC layer 38 becomes relatively thick, cross erasure is alleviated, and above 20 nm, the property is improved until no cross erasure is observed.

That is, it has been confirmed that, if the ratio of the DLC layer 38 with a high heat conductivity is increased in the interference layer between the recording layer 15 and the reflection layer 18, heat is moderately released from the recording layer 15, and cross erasure is suppressed.

EXAMPLE 4

FIG. 6A is a cross-sectional view roughly showing the structure of a disc prepared in this example. In substantially the same process as that of Example 1, sequentially stacked on a PC substrate 1 were a 100 nm thick ZnS layer (RF output of 500 W) 12, 70 nm thick SiO layer (RF output of 600W) 13, 80 nm thick $Cu_2O$ layer (RF power of 1 kW) 14, 5 nm thick GeN layer (RF output of 250 W) 30a, 20 nm thick $Ge_{21}Sb_{23}Te_{56}$ recording layer 15, t nm thick GeN layer 30b, ZnS(80%)—$SiO_2$(20%) layer 16, MgO layer 40, and 100 nm thick Au layer 18. The MgO layer 40 was deposited by RF sputtering under output of 1 kW.

In this example, six kinds of discs were prepared by fixing the total thickness of the ZnS(80%)—$SiO_2$(20%) layer 16 and the MgO layer 40 on the GeN layer 30b to 70 nm and changing the thickness of the MgO layer 40 from 0 to 70 nm.

For each disc, by conducting cross erasure evaluation under the evaluation condition 1 in Table 1, changes in 3T-carriers after hundred times of OW of 11T were evaluated.

FIG. 6B is a graph diagram showing changes in 3T carriers obtained on land tracks (L) and groove tracks (G) of each disc. As the thickness of the MgO layer 40 increases, changes in carriers decrease, and becomes substantially zero when and after the thickness increases to 40 nm. That is, as the MgO layer 40 becomes relatively thick, cross erasure is alleviated, and above 40 nm, the property is improved until no cross erasure is observed.

That is, it has been confirmed that, if the ratio of the MgO layer 40 with a high heat conductivity is increased in the interference layer between the recording layer 15 and the reflection layer 18, heat is moderately released from the recording layer 15, and cross erasure is suppressed.

EXAMPLE 5

FIG. 7A is a cross-sectional view roughly showing the structure of a disc prepared in this example. In substantially the same process as that of Example 1, sequentially stacked on a PC substrate 1 were a 15 nm ZnS(70%)—$SiO_2$(30%) layer 12, 80 nm thick $SiO_2$ layer (RF output of 1 kW) 13, 20 nm thick ZnS(70%)—$SiO_2$(30%) layer 14, 5 nm thick GeN layer (RF output of 250W) 30a, 20 nm thick $Ge_{25}Sb_{20}Te_{55}$ recording layer 14, 5 nm thick GeN layer 30b, 35 nm thick AlN layer 17 and 20 nm thick AlMo layer 18.

The AlN layer 17 was made by using a mixed gas of argon (Ar) and nitrogen ($N_2$) as the sputtering gas during deposition, and six kinds of discs were prepared by using the flow rate of nitrogen ($N_2$) and the pressure of the sputtering gas as parameters.

AlN samples stacked on substrates under the same conditions as those used for preparing those six kinds of discs were prepared, and heat conductivity was investigated by the measuring method explained in the text. Results obtained thereby are shown in Table 3 with indication of their deposition conditions.

TABLE 3

Relations between AlN Deposition Conditions and Heat Conductivity

| $N_2$ Flow Rate (%) | (Ar + $N_2$) Gas Pressure (Pa) | Heat Conductivity (J/msK) |
|---|---|---|
| 5 | 0.5 | 0.4 |
| 5 | 1.0 | 0.7 |
| 5 | 1.5 | 2 |
| 20 | 0.5 | 16 |
| 20 | 1.0 | 27 |
| 20 | 1.5 | 31 |

That is, six kinds of discs made as samples exhibited heat conductivity shown above.

On the other hand, a multi-layered structure of dielectric materials was prepared as an additional sample by sequentially stacking a 15 nm thick ZnS(70%)—$SiO_2$(30%) layer 12, 80 nm thick $SiO_2$ layer 13 and 20 nm thick ZnS(70%)—$SiO_2$(30%) layer 14, and its heat conductivity was measured. It was 1.8 (J/msK).

After that, those six kinds of discs shown in FIG. 7A were evaluated under the evaluation condition 2 in Table 1 using a short-wavelength light source. FIG. 7B shows changes in 3T-carriers after hundred times of overwriting on these six kinds of discs different in heat conductivity of the AlN layer 17, obtained by conducting cross erasure evaluation similar to that used for Example 1, using heat conductivity ratio between the stacked dielectric films 12, 13, 14 and the AlN layer 17.

In the range with low heat conductivity ratios, 3-T carriers decrease largely, and cross erasure occurs apparently. In contrast, as the heat conductivity ratio increases, the degree of decrease of 3T-carriers diminishes.

The degree of decrease of 3T-carriers in the range of heat conductivity ratios of and above 8 is remains within 2 dB. Especially when the heat conductivity ratio increases to 10 or more, the degree of decrease of 3T-carriers is restricted within 0.5 dB. That is, when the heat conductivity is below approximately 10, the degree of decrease of 3T-carriers becomes significantly small, and a good property is obtained.

As explained above, the invention can improve cross erasure significantly, by arbitrarily adjusting the heat conductivity in accordance with deposition conditions by using a multi-layered film of a dielectric layer with a high heat conductivity and a dielectric material with a low heat conductivity. Especially, by adjusting it such that their heat conductivity ratio be not less than 10, cross erasure can be alleviated most effectively.

Although some embodiments have been explained with reference to specific examples, the invention is not limited to these examples. For example, each of the substrate, lower interference layer, recording layer, upper interference layer and reflection layer may be made of any of the materials shown above, while ensuring the same effects.

Especially, the lower interference layer (between the substrate and the recording layer) may have a multi-layered structure including five layers or more, instead of three layers or four layers which are shown as specific examples.

Also, the upper interference layer (between the recording layer and the reflection layer) is not limited to a single layered structure or a multi-layered structure including two or three layers, but may be a multi-layered structure including more layers.

Although the specific examples have been explained, taking optical discs as optical recording mediums, the invention is not limited to them. Even when it is applied to other various optical recording mediums such as optical record card, for example, the same effects are promised.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

The entire disclosure of Japanese Patent Application No.H10-297328 filed on Oct. 19, 1998 including specification, claims, drawings and summary is incorporated herein by reference in its entirety.

What is claimed is:

1. An optical recording medium comprising:
    a first interference layer having a first surface to which light is applied and a second surface opposite to said first surface;
    a recording layer provided on said second surface of said first interference layer and changeable between crystalline and amorphous states when the light is irradiated;
    a second interference layer provided on said recording layer; and
    a reflection layer overlying said second interference layer, said first interference layer being made by stacking at least two kinds of layers made of different materials which are different dielectric constant, the heat conductivity of one of said at least two kinds of layers, which is the closest to said recording layer, being lower than the heat conductivity of the other of said at least two kinds of layers and
    the mean heat conductivity of said second interference layer being higher than the mean heat conductivity of said first interference layer.

2. The optical recording medium according to claim 1, wherein said mean heat conductivity of said first interference layer and said mean heat conductivity of said second interference layer are different by not less than 10 times.

3. The optical recording medium according to claim 1, wherein said second interference layer is made by stacking at least two kinds of layers made of different materials.

4. The optical recording medium according to claim 1, wherein each of said first interference layer and said second interference layer has an extinction coefficient not higher than 0.5.

5. The optical recording medium according to claim 1, wherein a reflectivity of a light from a crystalline part of said recording layer is lower than a reflectivity of a light from an amorphous part of said recording layer.

6. The optical recording medium according to claim 1, wherein a reflectivity of a light from the crystalline part of said recording layer is higher than a reflectivity of a light from the amorphous part of said recording layer.

7. The optical recording medium according to claim 1, further comprising a substrate underlying said first surface of said first interference layer and having an optical transmittance.

8. An optical recording medium comprising:
    a first interference layer having first surface to which light is applied and a second surface opposite to said first surface;
    a recording layer provided on said second surface of said first interference layer and changeable between crystalline and amorphous states when the light is irradiated;
    a second interference layer provided on said recording layer; and
    a reflection layer overlying said second interference layer, said first interference layer comprising a first layer formed under said recording layer, a second layer formed under said first layer, and a third layer formed under said second layer,
    said first and third layer being made of the same material, and said first and second layers being made of different materials which are different in dielectric constant, the heat conductivity of said second layer being higher than each heat conductivity of said first and third layers, and
    the mean heat conductivity of said second interference layer being higher than the mean heat conductivity of said first interference layer.

9. The optical recording medium according to claim 8, wherein said mean heat conductivity of said first interference layer and said mean heat conductivity of said interference layer are different by not less than 10 times.

10. The optical recording medium according to claim 8, wherein said second interference layer is made by stacking at least two kinds of layers made of different materials.

11. The optical recording medium according to claim 8, wherein each of said first interference layer and said second interference layer has an extinction coefficient not higher than 0.5.

12. The optical recording medium according to claim 8, wherein a reflectivity of a light from a crystalline part of said recording layer is lower than a reflectivity of a light from an amorphous part of said recording layer.

13. The optical recording medium according to claim 8, wherein a reflectivity of a light from the crystalline part of said recording layer is higher than a reflectivity of a light from the amorphous part of said recording layer.

14. The optical recording medium according to claim 8, further comprising a substrate underlying said first surface of said first interference layer and having an optical transmittance.

* * * * *